No. 830,110. PATENTED SEPT. 4, 1906.
F. A. SPENCER.
CLAMP FOR CIRCULAR AND IRREGULAR SHAPES.
APPLICATION FILED MAR. 21, 1905.

WITNESSES:
Ralph Lancaster
Russell M. Everett

INVENTOR:
Francis A. Spencer,
BY
Charles H. Pell,
ATTORNEY.

UNITED STATES PATENT OFFICE.

FRANCIS A. SPENCER, OF ORANGE, NEW JERSEY.

CLAMP FOR CIRCULAR AND IRREGULAR SHAPES.

No. 830,110.      Specification of Letters Patent.      Patented Sept. 4, 1906.

Application filed March 21, 1905. Serial No. 251,316.

*To all whom it may concern:*

Be it known that I, FRANCIS A. SPENCER, a citizen of the United States, residing at Orange, in the county of Essex and State of New Jersey, have invented certain new and useful Improvements in Clamps for Circular and Irregular Shapes; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

The objects of this invention are to provide a clamp especially adapted to be used in connection with the manufacture of columns according to my prior patent, No. 714,251, issued November 25, 1902; to secure a clamp adapted for general use upon bodies of circular or irregular cross-section; to enable the two shoes of the clamp to be brought close together, and thus utilize the full length of the thread of the bolt; to provide long nuts to engage the threaded bolt, and thus obviate the danger of stripping; to secure an easy and natural position of the bolt and its nuts without regard to the position of the shoes; to prevent the nuts from leaving the shoes while upon the bolt, and to obtain other advantages and results, some of which may be referred to hereinafter in connection with the description of the working parts.

The invention consists in the improved clamping device and in the arrangements and combinations of parts of the same, all substantially as will be hereinafter set forth, and finally embraced in the clauses of the claim.

Figure 1:
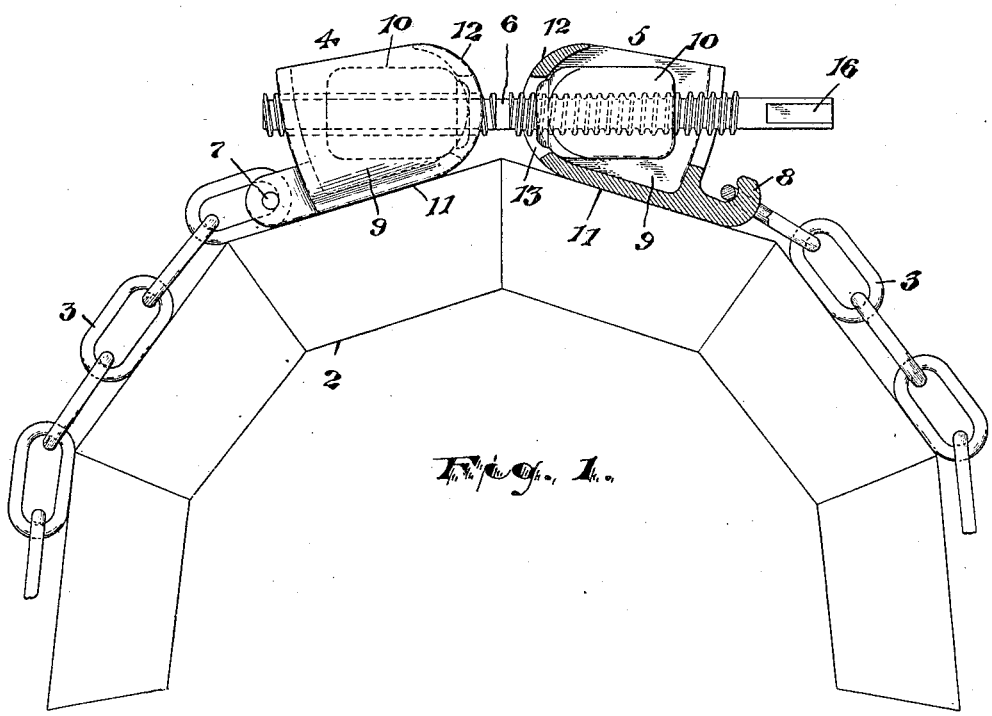
Figure 2:
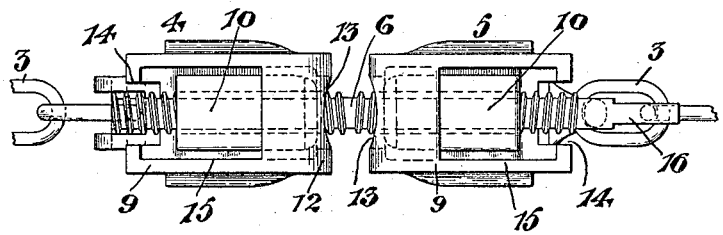
Figure 3:
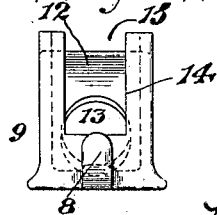

Referring to the accompanying drawings, in which like numerals of reference indicate corresponding parts in each of the several figures, Figure 1 is a side elevation of my improved clamp as applied to a column, a portion of the column and the chain being broken away and one of the shoes being shown in section. Fig. 2 is a plan of the clamp members; and Fig. 3 is a rear or outer end view of one of the shoes, the bolt and its nut being removed.

In said drawings, 2 indicates a column upon which my improved clamp is shown as applied, and 3 a chain adapted to extend around said column. The clamp proper comprises two members 4 and 5, adjustably connected by a threaded bolt 6, and at the outer end of one of said members one end of the chain 3 is permanently attached, as at 7, while the outer end of the other member provides a hook 8 or the equivalent onto which any link of the chain can be hooked, according to the size of the column. Each member of the clamp comprises a shoe 9 and a nut 10 within said shoe. The shoe is a box-like casting, preferably closed at its bottom 11 and having said bottom flat or plane at its under or outer surface to lie smoothly against the column without sinking or cutting into the same and having its front end rounded, as at 12. Said front end of the shoe is apertured, as at 13, to loosely receive the bolt 6, and likewise the rear end wall of the shoe is cut away from the top downward, as at 14, to permit the end of the bolt to project from the shoe. The top of the shoe is open, as at 15, to permit insertion of the nut 10, which is rounded at its forward end to fit against the rounded wall of the shoe and is bored and threaded longitudinally to receive the bolt 6. Said end of the nut is, however, much smaller in area than the wall of the shoe, being only large enough so that its edges securely engage around the aperture 13 for the bolt. Furthermore, the said end of the nut is rounded or curved on a radius less than that upon which the wall of the shoe is curved, and thus increased freedom of action is secured. The said vertical slot 14 of the rear wall of the shoe is narrower than the interior chamber of the shoe, while still wide enough to permit the bolt to pass through, and thus the rear end of the nut engages the said wall at the sides of the slot 14 and is stopped from further rearward movement. The height of the walls of the shoe, and especially the said rear wall, is such that when the bolt extends through the nut the limit of tipping of the two combined precludes raising the rear or outer end of the nut sufficiently to clear said rear wall and permit an out-passage from the shoe. The parts of the device are therefore retained at all times in position ready for use, in spite of rough handling and throwing around. At the same time the nut can be readily removed by first screwing out the bolt. Said bolt is straight and has projecting right and left threads on its opposite end portions adapted to enter the two nuts, so that when the bolt is turned by any suitable means, as by a wrench applied to a wrenchreceiving extremity 16 of itself, the two members 4 and 5 of the clamp will be forced toward each other. Of course in width the nuts 10 are closely enough fitted to the interior chambers of the shoes to prevent their turning therein, but at the same time they are loose enough both in this direction and longitudinally to permit their ready removal from the shoes.

By the construction thus described machine-work upon the two clamp members is reduced to a minimum, since the shoes can be cast all finished for use except for attaching the chain 3, as at 7, and the nuts all complete except for boring and tapping. Cheapness and ease of manufacture are thus secured, and at the same time there can be no cramping of the bolt and nuts even though the positions of the shoes change because of different-shaped bodies to which they are applied. Furthermore, a long engagement of the nuts with the bolt is secured to prevent stripping, and at the same time the clamp members 4 and 5 can be drawn close together, even into engagement with each other.

Having thus described the invention, what I claim as new is—

A clamp comprising a pair of members having means on their outside ends for engaging a chain, each member comprising a flat bottom and sides and having an open top, each member having a slot on the back and front, and the front of each member being rounded on the inside, a nut in each member having a rounded front end, and flat sides to prevent the nut from turning in its member, and a right and left threaded bolt passing through the nuts.

In testimony that I claim the foregoing I have hereunto set my hand this 14th day of March, 1905.

FRANCIS A. SPENCER.

Witnesses:
RUSSELL M. EVERETT,
M. V. DOYLE.